United States Patent [19]

Van Meulenbeke

[11] Patent Number: 4,747,766

[45] Date of Patent: May 31, 1988

[54] DEVICE FOR FILLING A MOLD TRAY WITH A THICK FLUID SUBSTANCE SUCH AS CHOCOLATE

[76] Inventor: Pierre Van Meulenbeke, Karel Soetelaan,, 25-2210 Borsbeek, Belgium

[21] Appl. No.: 936,688

[22] Filed: Nov. 25, 1986

[30] Foreign Application Priority Data

Nov. 28, 1986 [BE] Belgium ................. 2/60854

[51] Int. Cl.$^4$ .................. A23G 1/20; A23G 1/26
[52] U.S. Cl. .................. 425/159; 141/367; 222/643; 425/183; 425/259; 425/261; 425/377; 425/447
[58] Field of Search ............... 425/159, 182, 183, 256, 425/261, 447, 259, 145, 377; 222/330, 643; 426/512, 515; 141/152, 243, 367

[56] References Cited

U.S. PATENT DOCUMENTS

| | | | |
|---|---|---|---|
| 393,665 | 11/1888 | Ruby | 425/261 |
| 505,118 | 9/1893 | Mengelbier | 425/447 |
| 603,081 | 4/1898 | Harton | 425/447 |
| 663,620 | 12/1900 | Hoffman | 222/330 |
| 1,939,400 | 12/1933 | Lerche | 425/447 |
| 2,539,945 | 1/1951 | Bury | 425/192 |
| 2,641,384 | 6/1953 | Mateer | 222/643 |
| 2,673,675 | 3/1954 | Anderson | 222/330 |
| 3,040,381 | 6/1962 | Pioch | 425/447 |
| 3,148,802 | 9/1964 | Webb | 222/643 |
| 3,166,025 | 1/1965 | Hulse | 425/447 |
| 3,616,968 | 11/1971 | James | 222/643 |
| 4,582,097 | 4/1986 | Izzi et al. | 222/643 |

FOREIGN PATENT DOCUMENTS 267229 2/1965 Australia ................. 425/447

Primary Examiner—Willard E. Hoag
Attorney, Agent, or Firm—William A. Drucker

[57] ABSTRACT

A device for filling in a single operation of several mould spaces in a mould tray with a thick fluid substance such a chocolate, crème, fondant, and similar. The device consists primarily of a tank; a distribution vessel with filler openings; a transport pipe between the tank and the distribution vessel; a constant-flow pump connected to the tranport pipe and intended for pumping the substance from the tank to the distribution vessel and for pumping the substance out of the filler openings; at least one mould tray located under the distribution vessel with filler openings; a means which switches on and off the pump for pumping the substance; and a means which switches on and off the pump for withdrawing and retaining the substance in the filler openings once the mould tray is filled.

8 Claims, 2 Drawing Sheets

DEVICE FOR FILLING A MOLD TRAY WITH A THICK FLUID SUBSTANCE SUCH AS CHOCOLATE

The invention is for a device for filling in a single operation of several mould spaces in a mould tray with a thick fluid substance. This thick fluid substance may for example consist of chocolate for moulding pralines (continental chocolates), from crème or fondant for filling the as yet unclosed pralines or confectionery or whatsoever other items placed in the mould spaces.

Known devices for filling the mould spaces in mould trays consist mainly of : a tank filled with a thick fluid substance, such as chocolate for example; a number into a single row placed and simultaneously controlled switch cocks which are connected on the one hand to the said tank and on the other hand to an equal number of suck and blow units, whereby the filler openings of these cocks are in turn located above one of the rows of mould spaces in a mould tray underneath. The cocks are first turned in such a way that the substance is first sucked from the tank into the suck and blow units, the pistons of which can be adjusted in order to dertermine the volume of the sucked-up substance and are then turned so that the sucked-up substance is pushed from the suck and blow units via the filler openings of the cocks into a single row of mould spaces in the mould tray underneath. This procedure is then repeated in order to fill each following row of mould spaces in the mould tray, the mould tray being moved for every filling.

This known device has, however, as chief disadvantage that only a single row of mould spaces can be filled at a time and not all rows of mould spaces of the mould tray are filled simultaneously. The mould tray must therefore be moved each time the next row of mould spaces is to be filled, until all the rows of mould spaces are filled. Other disadvantages are that the device is bulky, complicated and of an expensive construction, that the pistons in the suction and compression units are difficult to set accurately and that the entire device requires quita a lot of maintenance.

In order to overcome these difficulties, according to the main characteristic of the invention, a device is created which consists primarily of a tank for the thick fluid substance; a distribution vessel with filler openings which serves to collect the substance and to distribute the substance flowing out; a transport pipe between the tank and the distribution vessel for the transportation of the substance; a constant-flow pump on the transport pipe for pumping the substance from the tank to the distribution vessel and pushing the substance out of the filler openings; at least one mould tray located under the distribution vessel with the filler openings and which is filled with the substance; a means of switching the pump on and off for pumping the substance to the distribution vessel; and a means of switching the pump on and off for withdrawing and retaining the substance in the filler openings of the distribution vessel, after the mould tray has been filled.

With this relatively simple and easy to maintain device it is possible to fill very quickly all the mould spaces of a mould tray simultaneously and thus in a single operation. Moreover the adjustment of the desired volume of thick fluid substance to be supplied is easy to carry out by means of timers and furthermore use can be made of easily replaced filling plates which form the bottom of the distribution vessel by which it is possible to use filling plates with any number of filler openings of whatsoever shape and size.

By way of example a more detailed description of a chosen but by no means limited embodiment of the device in accordance with the invention is given hereafter.

BRIEF DESCRIPTION OF THE DRAWINGS

This description refers to the attached drawings in which.

Figure 1:
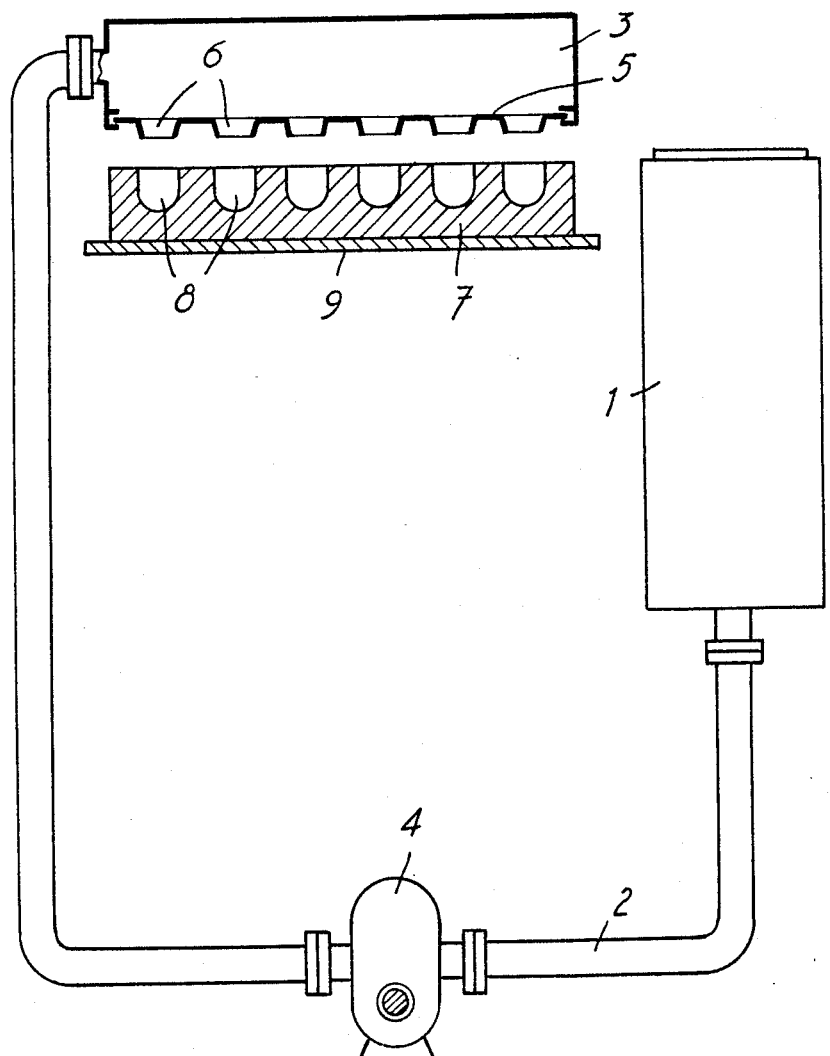
FIG. 1 is a schematic representation of the device according to the invention, where the mould tray and distribution vessel are shown in section.
Figure 2:
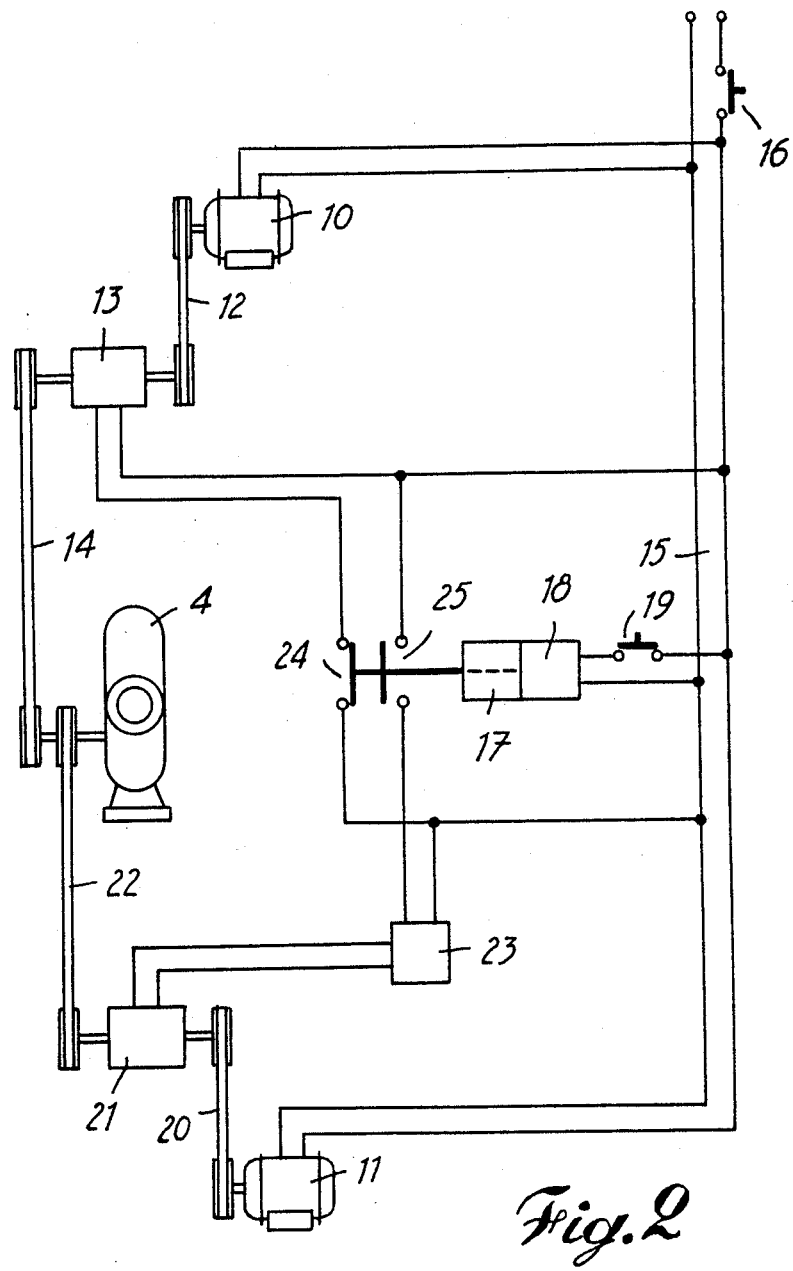
FIG. 2 shows the electrical diagram of the device.

In this device it will be seen that there is a tank 1 which is filled with the thick fluid substance such as chocolate, crème, fondant or similar. This tank 1 is connected by a transport pipe 2 to a distribution vessel 3. The thick fluid substance is pumped by a constant-flow pump 4 which is connected to the transport pipe 2, from the tank 1 to the distribution vessel 3. This pump can be of whatsoever sort and can for example be a gearwheel or wormscrew pump. The distribution vessel 3 has a prismatical shape and the bottom consists of a replaceable filler plate 5 provided with nozzles 6 over its entire area through which the thick fluid substance is forced out. This filler plate can be attached to the distribution vessel 3 by any means whatsoever. Under the distribution vessel 3 with filler plate 5, a mould plate 7 with mould spaces of whatsoever sort over its entire area is placed in such a way that the nozzles 6 are located exactly above the said mould spaces 8. A number of mould trays can be located one behind the other on a conveyor belt 9 which is actuated whenever a mould tray is entirely filled in a single operation by the distribution vessel 3 with substance so that each time a filled mould tray is removed and an empty mould tray located under the distribution vessel 3. The removable filler plate 5 can be replaced by another filler plate 5 with any number of nozzles 6 of whatsoever shape and dimensions, the number of which corresponds to the number of mould spaces 8 in a selected mould tray 7. The pump 4 is one for the purpose of pumping the substance through the transport pipe 2, driven by a clockwise electrical motor 10 and two for the brief withdrawal and retention of the substance in the nozzles 6, by a counter-clockwise electrical motor 11, as described in greater detail below. The clockwise electrical motor 10 drives through a belt or chain transmission 12 an electrically controlled drive clutch 13 is the part of which is to be engaged drives a pump 4 via a belt or chain transmission 14. The drive clutch 13 is connected to an electrical circuit 15 with main switch 16 to which also the electrical motor 10 is connected. Said drive clutch 13 is actuated by a relay 17 controlled by an adjustable timer 18 which is also connected to the said electrical circuit 15 and which is turned on and off by a switch 19. The counter-clockwise motor 11 drives a second electrically controlled drive clutch 21 via a belt or chain transmission 20, the part of which is to be engaged drives pump 4 in the opposite direction via a belt or chain transmission 22, than such is necessary for pumping the substance. The said second drive clutch 21 is controlled by a second timer 23 which also forms part of the electrical circuit 15 and which is turned on and off in turn by relay 17.

The operation of the device described above is described below.

The main switch 16 is pressed, causing the two electrical motors 10 and 11 to turn in opposite directions. As a consequence the electrical motor 10 drives the disengaged drive clutch 13 and the electrical motor 11 drives the second disengaged drive clutch 21. The timer 18 is set in such a way that, as set out here below, the pump 4 can operate long enough to pump just enough substance to fill the mould tray 7 in a single operation. The filling time can be set on the timer 18 in relation to the size of the mould tray 7 and the distribution vessel 3 an the number of mould spaces 8 in the mould tray 7. Similarly the timer 23 is set in such a way that the pump can be driven long enough in the opposite direction, to withdraw the substance briefly and to retain it in the nozzles 6 of the filler 15 plate 5, which forms part of the distribution vessel 3. Next the switch 19 is pressed either manually, synchronously with the conveyor belt 9 or for example by detection in combination with the presence of the mould trays 7. As a result the timer 18 starts to run and the relay 17 closes the contacts 24, so that the drive clutch 13 engages the electrical motor 10 to the pump 4 via the belt or chain transmissions 12-14. As a result the thick fluid substance is pumped from the tank 1 to the distribution vessel 3 and fills the mould spaces 8 in the mould tray 7 by means of the nozzles 6. The time required for this is, as mentioned above, set beforehand on the timer 18 and when this time has elapsed the relay 17 is operated by the timer 18 in such a way that the contacts 24 are opened. As a result the drive clutch 13 is uncoupled, so that the pump 4 comes to a standstill and the pumping of the substance is ceased. At the same time the contacts 25 are closed by relay 17, as a result of which the preset timer 23 begins to run and the drive clutch 21 switches on in such a way that the electrical motor 11 drives the pump 4 via the belt or chain transmissions 20 and 22. During this operation the pump 4 is very briefly driven in the opposite direction and just long enough to withdraw the substance and retain it in the nozzles 6, thus avoiding the formation of droplets on the nozzles 6. At the same time this prevents further dripping. When the brief time set on the timer 23 has elapsed the electrical circuit of the drive clutch 21 is interrupted, so that pump 4 comes to a standstill and switch 19 cuts off the current of timers 18 and 23. The entire operation can then be repeated with a newly advanced mould tray 7 which again presses the switch 19. This switch can be operated manually or automatically synchronous with the movement of the conveyor belt carrying the mould trays. Similarly at the same time this switch can be actuated by the detection of the moulds as they are advanced.

It goes without saying that the pump and all the other elements described above could be replaced with other elements serving the same function and that their location with respect to one another can differ. Finally it goes without saying that the device could be supplemented by other elements which could improve its practical operation.

I claim:

1. Device for the filling of mold trays with a thick fluid substance, such as chocolate, creme, fondant and the like, comprising, in combination, a tank for a thick fluid substance; a distribution vessel with filler openings which serves to collect the substance flowing out of the tank and to distribute the substance flowing out; a transport pipe between the tank and the distribution vessel for the transportation of the substance to the distribution vessel; a constant-flow pump connected to the transport pipe for pumping the substance from the tank to the distribution vessel and forcing the substance out of the filler openings; at least one mold tray located under the distribution vessel with the filler openings and which is filled with the substance; driving means for driving the pump in one direction for pumping the substance from the tank to the distribution vessel; means for switching the driving means on and switching off this means when the mold tray is filled by the pump; driving means for driving the pump in the opposite direction; and means for switching the second driving means on and off for withdrawing and retaining by means of the pump the substance in the filler openings of the distribution vessel, after the mold tray has been filled.

2. Device as defined in claim 1, in which the filler openings in the distribution vessel comprise spaced nozzles fitted in a interchangeable filler plate which forms the bottom of the distribution vessel.

3. Device as defined in claim 2, in which the device is provided with interchangeable plates with nozzles of various shapes, dimensions and layout.

4. Device as defined in claim 1, in which the constant-flow pump comprises a gearwheel pump.

5. Device as defined in claim 1, in which the constant-flow pump comprises a wormscrew pump.

6. Device as defined in claim 1, in which the device which turns the pump on and off for pumping the substance from the tank to the distribution vessel, comprises an electrical motor, an electrically controlled drive clutch on the one hand driven by said electrical motor and on the other hand meant for driving said pump and an adjustable timer which controls the electrical circuit of the drive clutch for engaging and disengaging the electrical motor with the pump.

7. Device as defined in claim 1 in which the means that switches the pump on and off for the withdrawal and retention of the substance in the filler openings for the distribution vessel, comprises an electrical motor which turns in a counter-clock direction an electrically operated drive clutch driven on the one hand by said electrical motor and on the other hand intended for driving said pump, and an adjustable timer which controls the electrical circuit of said drive clutch for engaging and disengaging of said electrical motor with pump.

8. Device as defined in claim 1, comprising an electrical motor, an electrically controlled drive clutch on the one hand driven by said electrical motor and on the other hand for driving said constant-flow pump for pumping the substance.an adjustable timer which controls the electrical circuit of said drive clutch for engaging and disengaging said electrical motor with the pump a second electrical motor which turns in a direction opposite to that of first said electrical motor, an electrically controlled second drive clutch driven on the one hand by said second electrical motor and on the other hand intended for driving said pump for withdrawing and retaining the substance in the filler openings of the distribution vessel:and a second adjustable timer which controls the electrical circuit of said second drive clutch for engaging and disengaging of the second electrical motor with pump, first said adjustable timer also controls the electrical circuit of said second timer.

* * * * *